United States Patent
Hartwell et al.

(10) Patent No.: US 6,640,272 B1
(45) Date of Patent: Oct. 28, 2003

(54) AUTOMATED BACKPLANE CABLE CONNECTION IDENTIFICATION SYSTEM AND METHOD

(75) Inventors: David Hartwell, Bolton, MA (US); David Golden, Woonsocket, RI (US); Glenn Herdeg, Acton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 09/652,494

(22) Filed: Aug. 31, 2000

(51) Int. Cl.[7] .............................................. G06F 13/00
(52) U.S. Cl. ...................... 710/104; 710/300; 710/301; 710/302; 710/303; 710/304
(58) Field of Search ................................. 710/100, 300, 710/301, 302, 303, 304, 104

(56) References Cited

U.S. PATENT DOCUMENTS 5,689,726 A * 11/1997 Lin ............................... 710/10
5,790,374 A * 8/1998 Wong .......................... 361/385

* cited by examiner

Primary Examiner—Xuan M. Thai
Assistant Examiner—Tim Vo

(57) ABSTRACT

An automated backplane cable connection system (and method) for manually connecting a cluster of processor modules to other modules or I/O boxes uses a programmed server management control console which identifies connection terminals provided on the processors/I/O boxes and controls LEDs which are associated with the connection terminals, on a one to one basis. The programmed server management console uses diagnostic circuitry and causes LEDs corresponding to connection terminals engaged by a newly made cable connection to initially light up, and enables them to turn off if the newly made cable connection is proper as verified by the diagnostic circuitry. The cluster of processor modules may be connected to a plurality of I/O boxes through an Ethernet LAN. The processor modules or I/O boxes may have sufficient nonvolatile memory to remember backplane cable connections which have already been made according to user needs, as initially guided by the programmed server management control console. From the memory, replacement of cables when necessary, is facilitated, without the need for assistance by the server management console. If connection changes are needed because of design modifications or additions, the server management control console would again be needed. If a newly made backplane connection is improper or is broken, the diagnostic circuitry will enable the corresponding LEDs to stay lit or to start flashing (depending in the design), thereby signaling need for intervention. Backplane cable connections may be made by semiskilled personnel by using this invention. Also, "hot-add, hot-replace, hot-swap" of connection is easily possible by this invention without interrupting continuity of operation of the system.

26 Claims, 13 Drawing Sheets

| COMMAND DESCRIPTOR | CODE |
|---|---|
| SET CABLE TEST SIGNAL STATE | 0601h |
| GET CABLE TEST SIGNAL STATE | 0602h |
| SEND CABLE ID | 0603h |
| RECEIVE CABLE ID | 0604h |
| GET MBM IP CABLING | 0605h |
| GET PBM IO CABLING | 0606h |
| GET CABLING CONFIGURATION | 0607h |
| RECONFIGURE CABLING | 0608h |

CABLE TEST GROUP

FIG. 11

AUTOMATED BACKPLANE CABLE CONNECTION IDENTIFICATION SYSTEM AND METHOD

INCORPORATION BY REFERENCE OF RELATED APPLICATIONS

This patent application is related to the following co-pending, commonly owned U.S. Patent Applications, all of which were filed on even date with the within application for United States Patent and are each hereby incorporated by reference in their entirety:

U.S. patent application Ser. No. 09/652,494 entitled ADAPTIVE DATA PRE-FETCH PREDICTION ALGORITHM;

U.S. patent application Ser. No. 09/653,133 entitled UNIQUE METHOD OF REDUCING LOSSES IN CIRCUITS USING V2 PWM CONTROL;

U.S. patent application Ser. No. 09/652,641 entitled IO SPEED AND LENGTH PROGRAMMABLE WITH BUS POPULATION;

U.S. patent application Ser. No. 09/652,458 entitled PARTITION FORMATION USING MICROPROCESSORS IN A MULTIPROCESSOR COMPUTER SYSTEM, issued on Sep. 24, 2002 as U.S. Pat. No. 6,456,510;

U.S. patent application Ser. No. 09/652,984 entitled SYSTEM AND METHOD FOR PROVIDING FORWARD PROGRESS AND AVOIDING STARVATION AND LIVE-LOCK IN A MULTIPROCESSOR COMPUTER SYSTEM;

U.S. patent application Ser. No. 09/653,180 entitled ONLINE ADD/REMOVAL OF SERVER MANAGEMENT INFRASTRUCTURE;

U.S. patent application Ser. No. 09/652,459 entitled AUTOMATED BACKPLANE CABLE CONNECTION IDENTIFICATION SYSTEM AND METHOD;

U.S. patent application Ser. No. 09/652,980 entitled CLOCK FOR-WARD INITIALIZATION AND RESET SIGNALING TECHNIQUE;

U.S. patent application Ser. No. 09/652,985 entitled COHERENT TRANSLATION LOOK-ASIDE BUFFER;

U.S. patent application Ser. No. 09/652,645 entitled DETERMINIS-TIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 entitled VIRTUAL TIME OF YEAR CLOCK.

BACKGROUND OF THE INVENTION

Field of the Invention

This invention generally relates to automated cable management of connections in multiprocessor systems which cooperate with a multiplicity of I/O devices. More particularly, the invention is directed to management of backplane cable connections between multiprocessors and I/O units.

BACKGROUND OF THE INVENTION

With the advent of multiprocessor systems wherein a plurality of microprocessors is grouped together in a cluster to perform complex tasks and to handle a significant volume of information as desired by a user, it is common to use a multiplicity of I/O units arranged in a desired configuration and connected to the multiprocessors as dictated by customer needs. It is common presently to have a multiplicity of processors connected in an array which may be symmetrical. Such configurations are called Symmetrical Multi-Processors (SMP). Invariably, there is a very large number or cables required to be connected between the I/O units and the microprocessor cluster. Also, there is usually need to add or swap connections while the microprocessors and I/O units are performing, or to repair/replace a connection which is live. Such handling of connections is referred to as hot-add, hot-swap, and hot-repair as terms in the art.

Adding/swapping or replacing connecting cables should be done in a fool-proof and reliable manner. To this end, receptacles which correspond to terminals where connecting cables need to be inserted should be identified, by means such as numbering or coding. With an increasing number of cable connections which invariably cross each other, the cables do tend to get tangled, which makes tracking and connection very difficult. Also, known methods of cable management configurations do not easily lend themselves to "hot-add, hot-swap and hot-repair." Moreover, known backplane cable connection configurations do not have any reliable system to check the accuracy and the integrity of backplane cable connections after the connections are made.

SUMMARY OF THE INVENTION

The present invention is directed to a backplane cable connection system between at least one processor and at least one I/O unit. This invention easily lends itself to "hot-add, hot-swap and hot-repair" of backplane cable connections, without the need for skilled manual labor. The backplane cable connections are expediently so programmed using the invention that a programmed control unit prompts a technician or other semi-skilled person to complete each connection as required by the user's needs. Each connection which is completed will cause an LED or other such visual means to light up. When each connection is made manually, a diagnostic circuitry which is part of the system verifies the correctness of each manual cable connection made, and the connection is verified as proper by turning off the LEDs (visual means) corresponding to the connection made. If a manual connection which is just made is either incorrect or broken, the diagnostic circuitry keeps the LEDs (or visual means) on/flashing, thereby indicating that corrective action is needed.

In the absence of the automated cable management of the present invention, it would be a formidable task to find out if a wrong cable connection exists or, if a connection already made is proper but broken.

The present invention provides an improved backplane cable connection configuration preferably in the form of an automated cable connection identification mechanism comprising: means for providing an identification of connection terminals on a processor/I/O box, to be connected to connection terminals on a processor or I/O box; each of the connection terminals having a visual means which can turn on or off to indicate a connection cable being manually inserted to establish a connection; a diagnostic circuitry to check if identified connection terminals are properly manually connected in accordance with customer requirements, said diagnostic circuitry having the capability of turning off the visual means relating to those connection cables which are properly connected as verified by the diagnostic circuitry, and ensuring that connection cables with faulty or broken connections will have their corresponding visual means on or blinking.

In another aspect, the invention provides an automated cable connection identification mechanism for a plurality of processors or I/O boxes to be electrically connected to one or more processors or I/O boxes, comprising:

means for providing an identification of connection terminals on each processor/I/O box, an LED which can turn on/off at each said connection terminal;

a programmed computer to prompt manual connection of connection terminals as required by a user by means of predetermined connection cables, each said manual connection causing the corresponding LED to light up; and a diagnostic and control circuitry to verify correctness of the manual connection made, and to cause each lit LED to turn off if a corresponding manual connection made is correct, and to retain each lit LED in an on/blinking condition if a corresponding manual connection made is incorrect/broken.

A dedicated console PC may be provided to house the diagnostic and control circuitry, with the capability of being programmed suitably depending on customer needs.

Advantageously, the system of the present invention can be provided with sufficient nonvolatile memory capability either in the microprocessor or the I/O units or both, to remember correct backplane connections after they are made so that any dedicated programmed console PC if used, may be dispensed with after the proper backplane connections are initially made.

An algorithm is expediently used in a preferred embodiment of the present invention to figure out how to use the shortest length of each connecting cable to interconnect a processor with an I/O box or another processor as the case may be, taking into consideration the physical location of the processors and I/O boxes.

In a preferred embodiment, backplane cable connections between a processor or an I/O box are made through a software Ethernet which might comprise a LAN.

BRIEF DESCRIPTION OF THE DRAWINGS

The above and further advantages of the invention may be better understood by referring to the following description in conjunction with the accompanying drawings, in which like reference numbers indicate identical or functionally similar elements:

FIG. 11 shows an example of cable test group messages;

DETAILED DESCRIPTION OF AN ILLUSTRATIVE EMBODIMENT

FIGS. 1–8 illustrate an overview of an exemplary system using an array of processors and I/O devices in which the automated backplane cable connection system and method of the present invention can be implemented. The illustrated example uses a commercial name "MARVEL" for the system.

Figure 1:
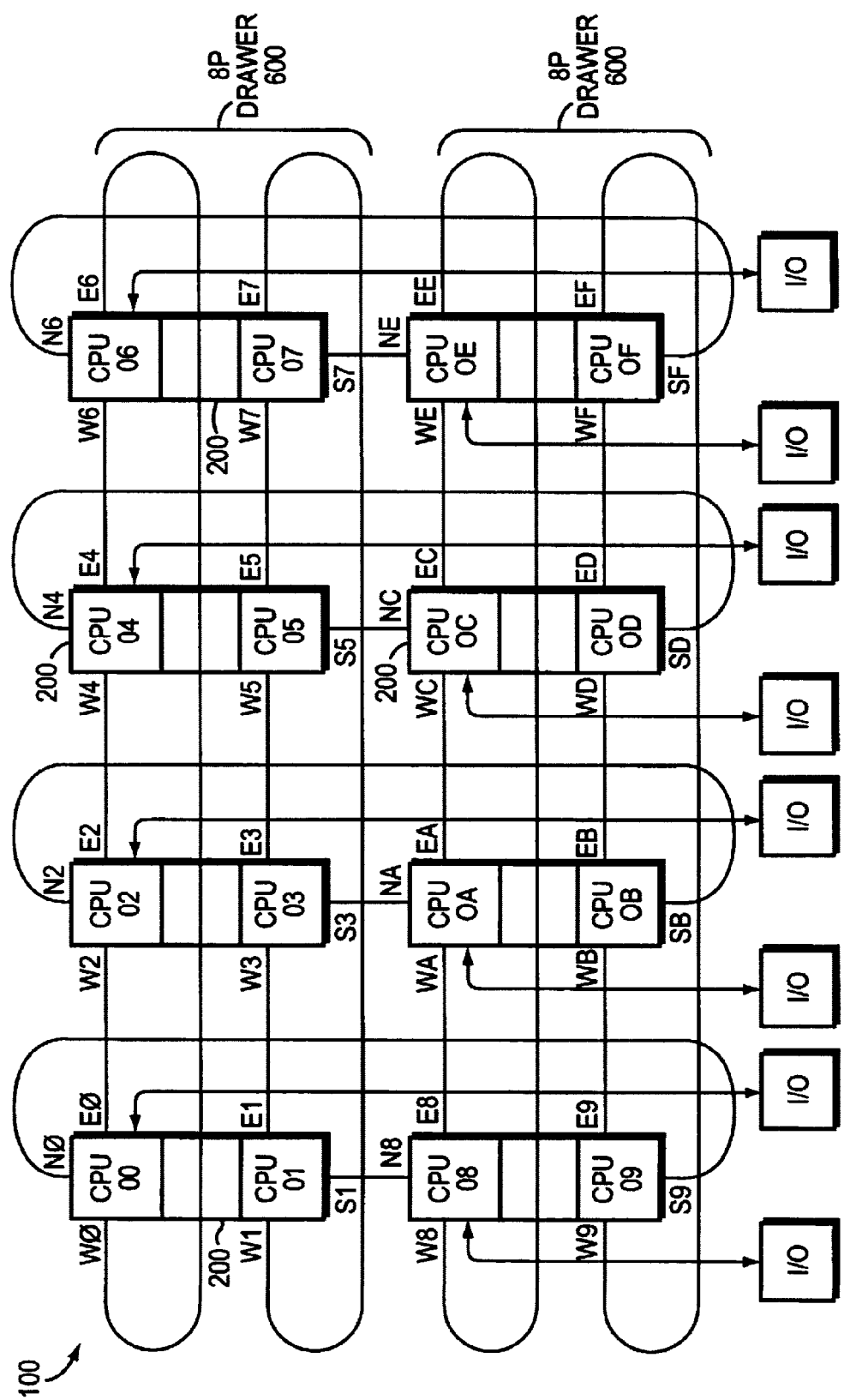
FIG. 1 is a schematic block diagram of a symmetrical multiprocessor (SMP) system comprising a plurality of dual processor (2P) modules interconnected to form a two dimensional (2D)-torus mesh configuration.

FIG. 1 is a schematic block diagram of a symmetrical multiprocessor (SMP) system 100 comprising a plurality of processor modules 200 interconnected to form a two dimensional (2D)-torus mesh configuration. Each processor module 200 comprises two central processing units (CPUs) with connections for two input/output (I/O) ports along with 6 inter-processor (IP) network ports. The network ports are preferably referred to as North (N), South (S), East (E) and West (W) compass points. The North-South (NS) and East-West (EW) compass point connections create a (Manhattan) grid. Additionally, the outside ends of the mesh wrap-around and connect to each other. I/O traffic enters the 2D torus via I/O channel connections between the CPUs and I/O subsystem. Each compass point is coupled to an IP channel that comprises 2 unidirectional, clock forwarded links.

Figure 2:
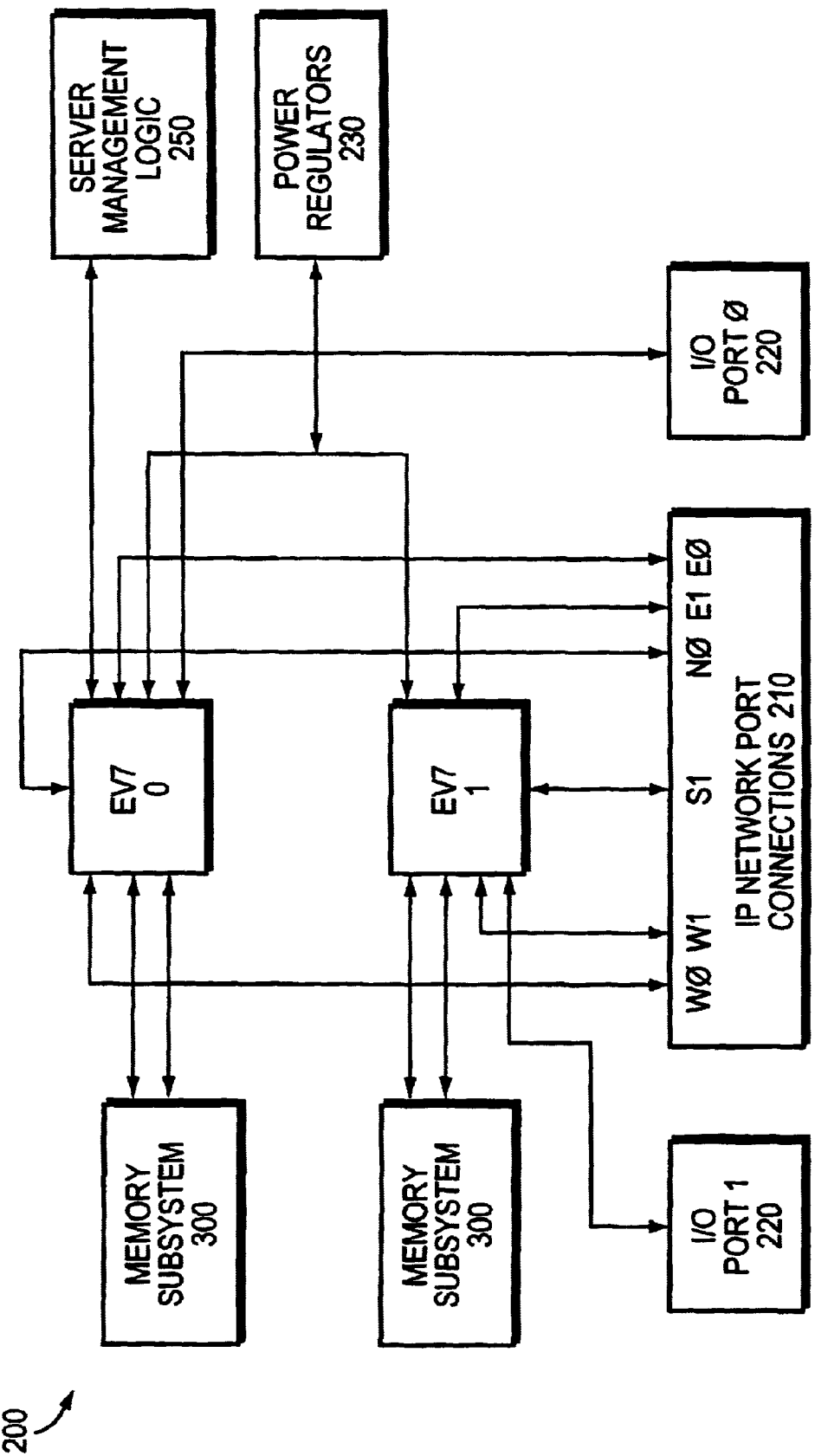
FIG. 2 is a schematic block diagram of a 2P module of FIG. 1.

FIG. 2 is a schematic block diagram of the dual CPU (2P) module 200. As noted, the 2P module 200 comprises 2 CPUs with connections 210 for the IP ("compass") network ports and an I/O port 220 associated with each CPU. The 2P module 200 also includes power regulators 230, system management logic 250 and memory subsystem 300 coupled to 2 memory ports in accordance with an aspect of the present invention, the system management logic 250 cooperates with a server management system to control functions of the SMP system. Each of the N, S, E and W compass points, along with the I/O and memory ports use clock-forwarding, i.e., forwarding clock signals with the data signals, to increase data transfer rates and reduce skew between the clock and data.

Each CPU is preferably an EV7 processor comprising 2 memory controllers, an I/O interface and 4 network ports. In the illustrative embodiment as an example, the EV7 supports up to 256 processors and 256 I/O boxes.

The EV7 processor also expediently includes a RBOX that provides integrated routing/networking control functions with respect to the compass points. The EV7 further includes a ZBOX that provides integrated memory controller functions for controlling the memory subsystem.

The memory subsystem 300 is preferably implemented using RAMBUS technology and, accordingly, the memory space is generally divided between 2 RAMBUS controllers. However, an EV7 processor can operate with 0, 1 or 2 RAMBUS controllers.

Figure 3:
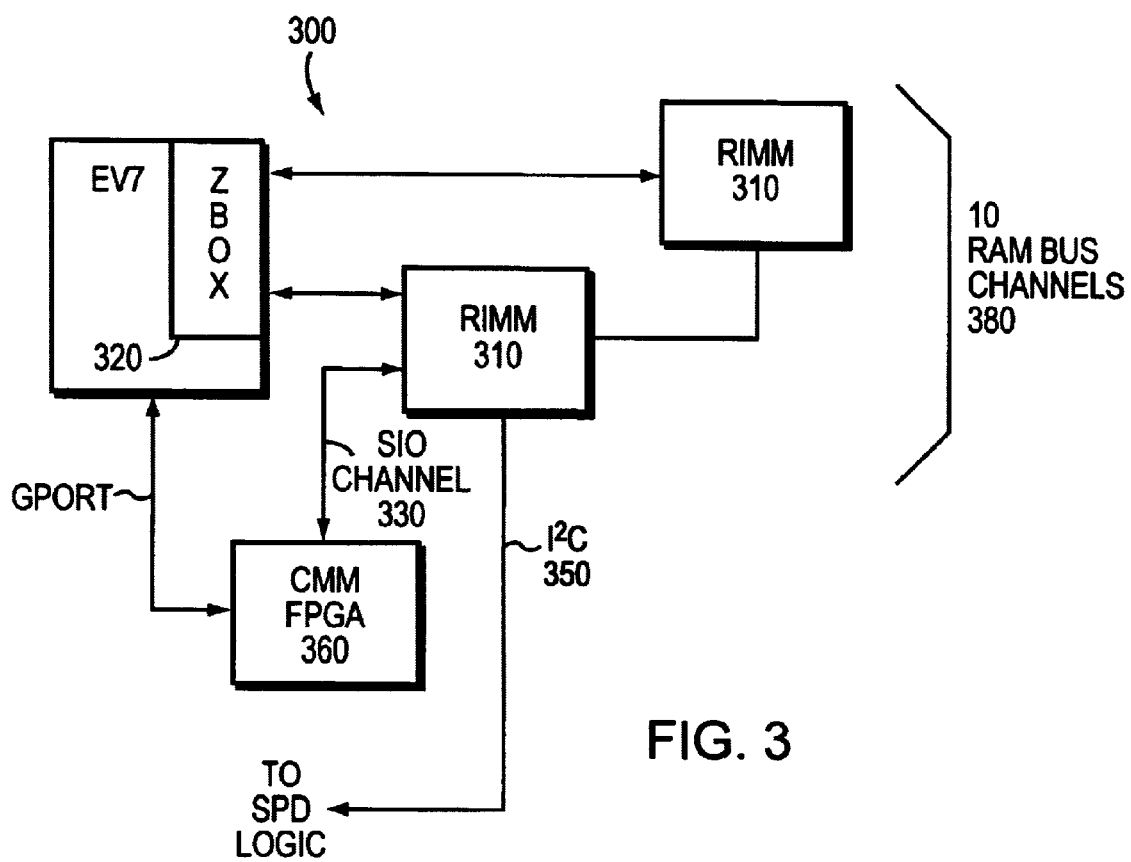
FIG. 3 is a schematic diagram of a memory subsystem of the SMP system.

FIG. 3 is a schematic diagram of the SMP memory subsystem 300 illustrating connections between the EV7 and RAMBUS memory modules (RIMMs 310). Software configures the memory controller logic (ZBOX 320) within the EV7 and the logic on each RIMM 310 before testing and initializing memory. Specifically, the memory subsystem components include 2 RAMBUS memory controllers (not shown) within the ZBOX 320, a RIMM 310 containing RDRAM memory devices, a serial I/O (SIO 330) channel to the RDRAMs, serial presence detect (SPD) logic (EEPROM data) via an I²C bus 350, and a CPU management module (CMM) field programmable gate array (FPGA 360) that interfaces between a CMM (not shown) and the EV7 processor.

Figure 4:
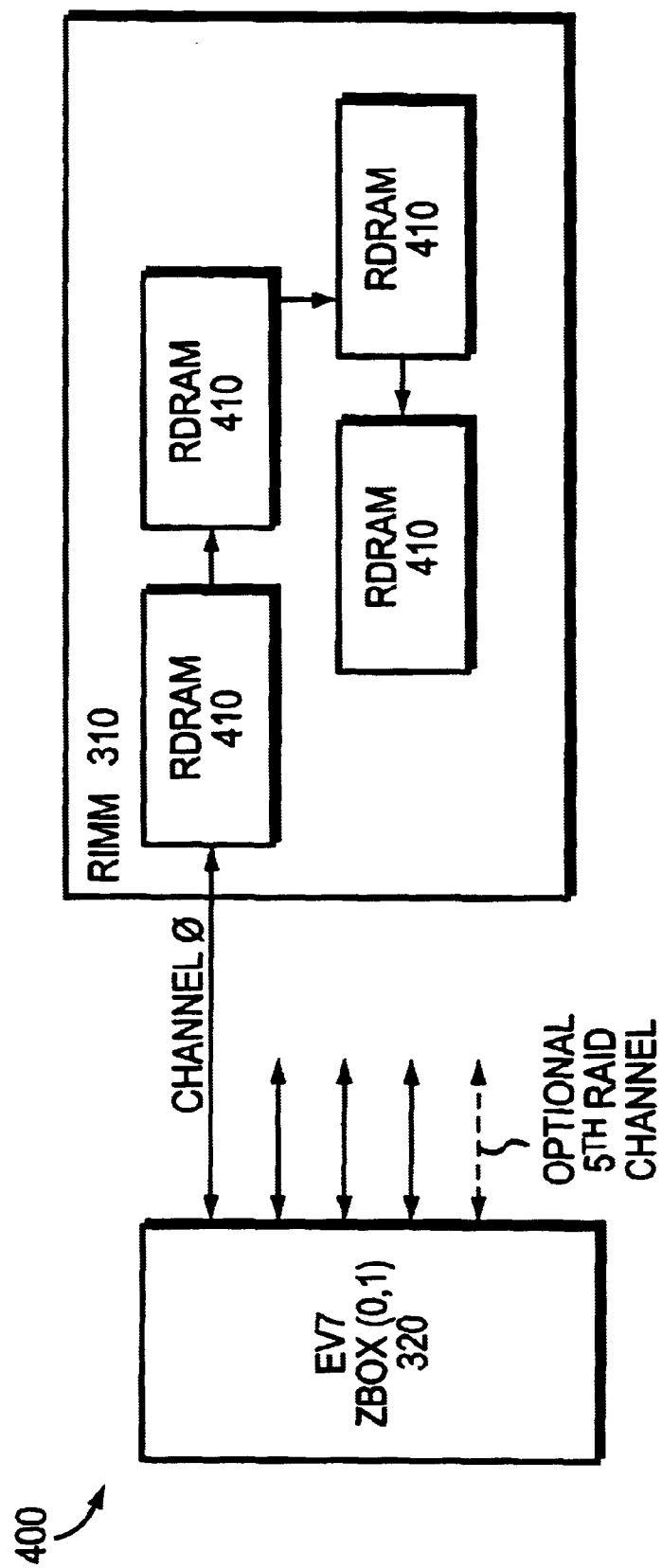
FIG. 4 is a schematic block diagram showing the organization of the memory subsystem of FIG. 3.

FIG. 4 is a schematic block diagram showing the RAMBUS memory organization 400. Both EV7 memory controllers (ZBOX0/ZBOX1) and the RDRAMs 410 contain programmable elements which configure the addressing and timing of each RDRAM on each channel. The RIMMs are visible to system software via 3 separate paths: the SPD logic (via the I²C bus 350), the SIO channel 330 and the RAMBUS channels 380.

The SPD path provides a data structure contained within a serial EEPROM located on each RIMM 310. The SIO path provides access to programmable timing and configuration registers contained on the RDRAM devices. The RAMBUS channel is the row/column serial data path to the RDRAMs. Each channel is connected to a physical RIMM that may contain up to 32 RDRAM devices.

Figure 5:
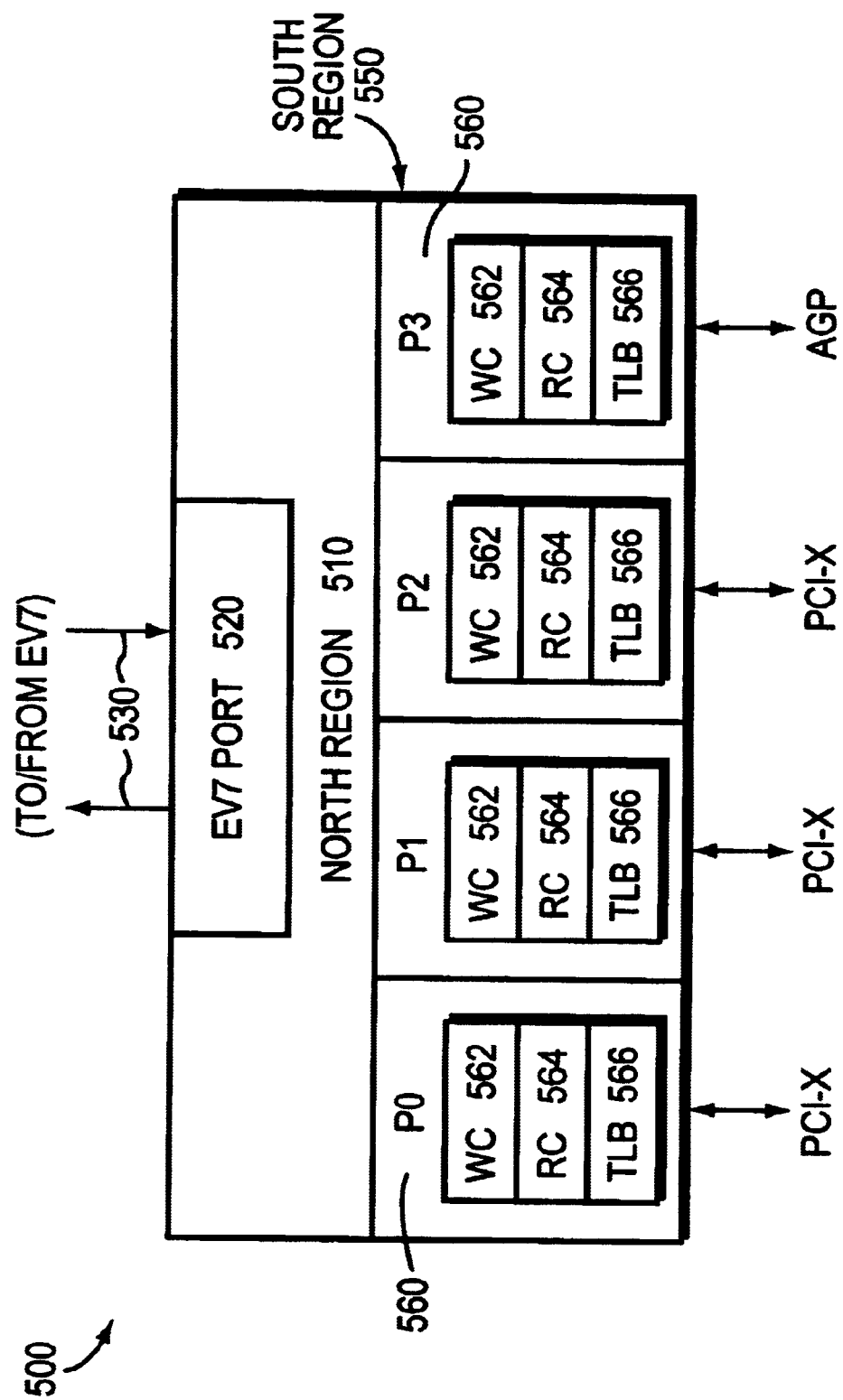
FIG. 5 is a schematic block diagram of an IO7 of an I/O subsystem of the SMP system.

FIG. 5 is a schematic block diagram of an IO7 device 500 that provides a fundamental building block for the SMP I/O subsystem. Each EV7 processor supports one I/O ASIC connection; however, there is no requirement that each processor have an I/O connection. In the illustrative embodiment, the I/O subsystem includes a PCI-X I/O expansion box with hot-swap PCI-X and AGP support. The PCI-X expansion box includes an IO7 plug-in card that spawns 4 I/O buses.

The IO7 500 comprises a North circuit region 510 that interfaces to the EV7 processor and a South circuit region 550 that includes a plurality of I/O ports 560 (P0–P3) that interface to industry standard I/O buses. In the illustrative embodiment, 3 of the 4 I/O ports 560 interface to the PCI-X bus, while the 4th port interfaces to an AGP bus. The IO7 generally includes the same functionality as provided by the IOA, IOD and PCA ASICs of the AS80, AS160, AS320 family of servers.

In accordance with an aspect of the present invention, a cache coherent domain of the SMP system extends into the IO7 and, in particular, to I/O caches located within each I/O port of the IO7. Specifically, the cache coherent domain extends to a write cache (WC 562), a read cache (RC 564) and a translation buffer (TLB 566) located within each I/O port 560. As described further herein, the read and write caches function as coherent buffers in that the information contained within these data structures is not maintained for long periods of time.

Figure 6:
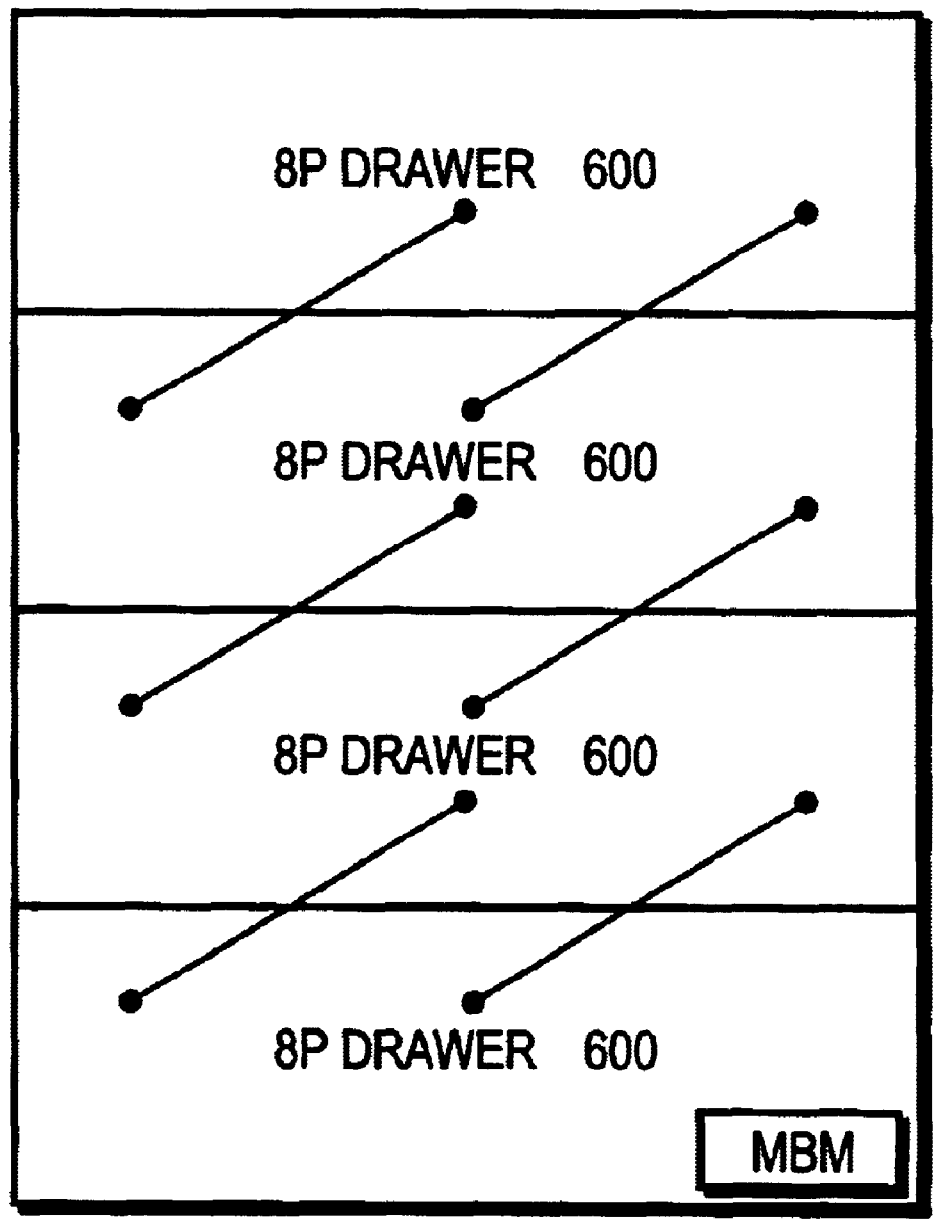
FIG. 6 is a schematic diagram of an illustrative embodiment of four (4) 8P drawers of the SMP system mounted within a standard 19-inch rack.

Referring again to the embodiment of FIG. 1, the 2D-torus configuration of the SMP system 100 comprises sixteen (16) EV7 processors interconnected within two 8P drawer enclosures 600. Specifically, there are four (4) 2P modules 200 interconnected by a backplane within each enclosure 600. This configuration is scalable up to a total of 256 processors. In the illustrative embodiment, four (4) 8P drawers may be mounted within a standard 19-inch rack (2 meters in length) as shown in FIG. 6. Mounting 4 8P drawers in a single rack creates a substantial cabling problem when interconnecting up to 256 processors within the 2D-torus configuration and when coupling the processors to the I/O subsystems via the IO7 devices 500 associated with the processors. In accordance with another aspect of the present invention, an efficient means for interconnecting cables among the 8P drawers of fully-configured, 19-inch racks is provided.

Figure 7:
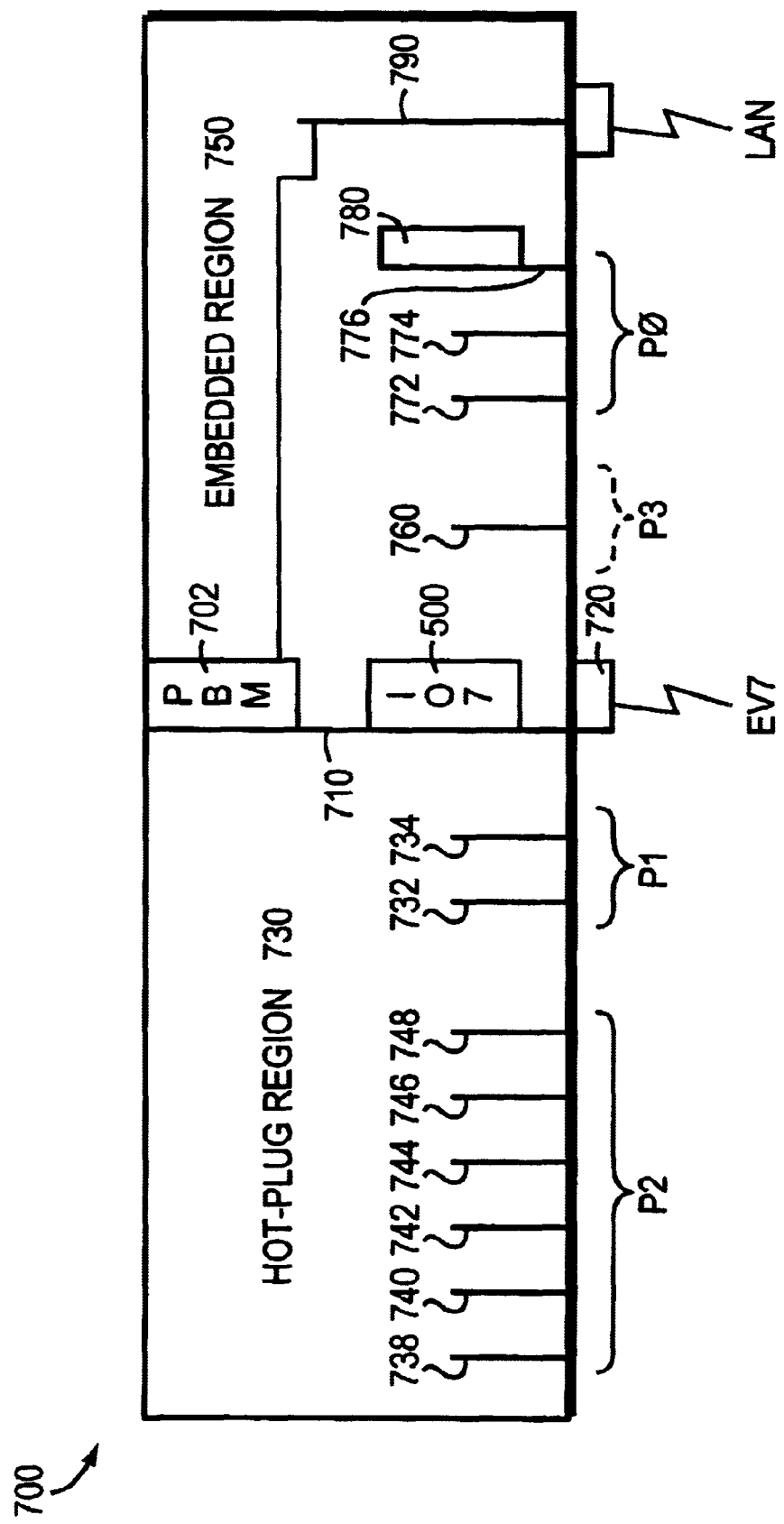
FIG. 7 is a schematic block diagram of an I/O drawer of the SMP system.

FIG. 7 is a schematic block diagram of an I/O drawer 700 of the SMP system which includes a first I/O riser card 710 containing an IO7 500, a connector 720 coupling the IO7 to the EV7 processor and a plurality of I/O buses. The speed of the I/O buses contained within the I/O drawer is a function of the length and the number of loads of each I/O bus. The I/O drawer is divided into two parts: a hot-plug region 730 and an embedded region 750. In the illustrative embodiment, there is a dedicated slot 760 adjacent to the I/O riser card 710 within the embedded region 750 that is dedicated to a 4× AGP Pro graphics card. Also included within the embedded region 750 are 3 standard, 64-bit PCI card slots 772–776, two of which may be occupied by additional AGP Pro cards. Otherwise, these PCslots are available for embedded I/O card options. For example, an I/O standard module card 780 may be inserted within one of the PCI slots 772–776.

Each I/O drawer 700 also includes power supplies, fans and storage/load devices (not shown). The I/O standard module card 780 contains an IDE controller for the storage/load devices, along with a SCSI controller for those devices and a universal serial bus that enables keyboard, mouse, CD and similar input/output functions. The embedded region 750 of the I/O drawer is typically pre-configured and not configured for hot-swap operations. In contrast, the hot-plug region 730 includes a plurality of slots adapted to support hot-swap. Specifically, there are 2 ports 732–734 of the hot plug region dedicated to I/O port one (P1 of FIG. 5) and 6 slots 738–748 dedicated to I/O port two (P2 of FIG. 5). Likewise, the dedicated AGP Pro slot 760 comprises port three (P3) and the 3 standard PCI slots 772–776 comprise port zero (P0). The I/O buses in the hot-plug region 730 are configured to support PCI and PCI-x standards operating at 33 MHz, 66 MHz, 100 MHz and/or 133 MHz. Not all slots are capable of supporting all of these operating speeds. In another aspect of the present invention, a technique is provided that enables all slots (under certain configurations) to support all operating frequencies described above.

Also included within the I/O drawer 700 and coupled adjacent to the IO7 is a PCI backplane manager (PBM 702). The PBM 702 is an integral part of a platform management infrastructure as described further herein. The PBM is coupled to a local area network (e.g., 100 Base T Ethernet) by way of another I/O riser board 790 within the I/O drawer. The local area network (LAN) provides an interconnect for the server management platform that includes, in addition to the PBM, a CMM located on each 2P CPU module and an MBM (Marvel backplane manager) located in each 8P drawer. Note that the cable coupling the IO7 to the EV7 on a 2P module may be up to 6 meters in length.

Figure 8:
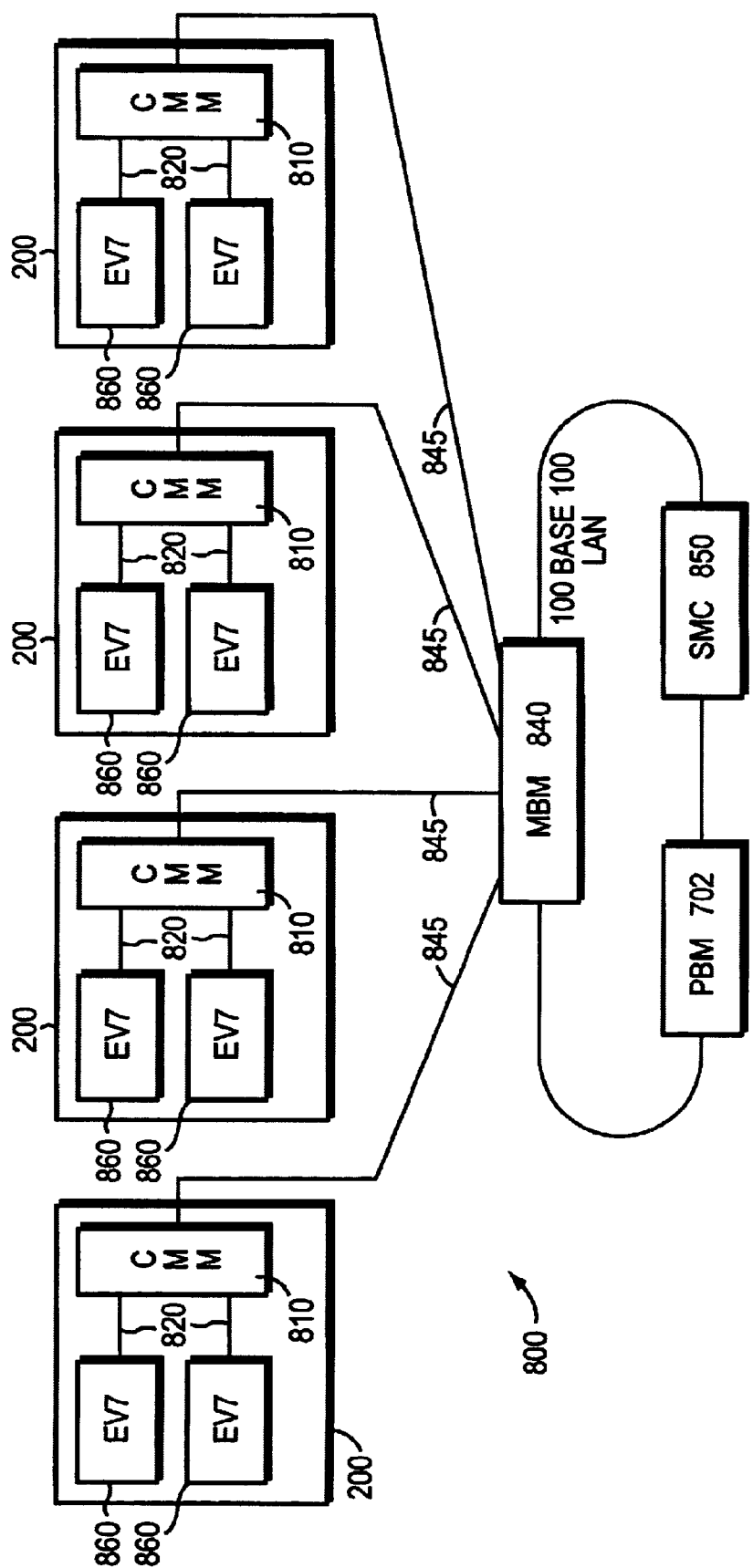
FIG. 8 is a schematic block diagram of a server management platform for the SMP system.

FIG. 8 is a schematic block diagram of the server management platform 800 for the SMP system. The server management comprises a 3-tier management scheme. At the lowest level, each 2P module 200 has a plug-in, CPU management module (CMM 810) that provides power and initialization control for the local 2P module. The CMM also interfaces directly to both EV7 processors via serial links 820 and provides communication support to a higher, intermediate level of the service management hierarchy.

The intermediate level of service management is the operation check box ("OC Box") (not shown) management provided by the MBM 840, which is preferably an independent plug-in card within an 8P drawer 600. Each CMM 810 on each 2P module 200 within an 8P drawer 600 communicates with an MBM 840 through a point-to-point serial connection 845 that is preferably implemented in etch so as to obviate the need for a cable connection. The MBM controls the overall operation of the OC Box by functioning as the master of the CMMs. In the illustrative embodiment, each MBM controls 4 CMM devices within an 8P drawer.

The MBM 840 spawns a server manager network port that is connected to a service management LAN hub. The MBMs 840 preferably communicate with the PBMs 702 in the I/O drawers via a TCP/IP protocol over a server management LAN. In the illustrative embodiment, the server management platform is preferably implemented as a 100 Base T (Ethernet) LAN, although similar types of local area network implementations, such as Token Ring or FDDI, may be advantageously used with the system.

A personal computer (PC) or similar network device connected to one of the ports of the service management LAN hub serves as a server management console (SMC 850). The SMC 850 provides the highest level of server management and, to the end, executes a platform management utility that provides a unified view of the entire SMP system for purposes of controlling the system, even if the system is divided into multiple hard partitions. From a physical implementation, the MBMs, PBMs and SMC are coupled to the service management hub; however, logically they are interconnected by the LAN.

The server management platform is used to bring up ("boot") the SMP system and create partitions. As used herein, a hard partition is defined as hardware resources capable of supporting a separate instance of an operating system. In addition, the server management platform facilitates hot-swap (insert/delete) of hardware resources into/from the system. For example, assume it is desirable to dynamically remove a 2P module 200 from the SMP system 100. The SMC 850 instructs the appropriate MBM 840 which, in turn, instructs the appropriate CMM 810 on the 2P module to power down its regulators 230 in preparation of removal of the module. It should be noted that the SMP system may "boot" and operate without a functioning SMC, but reconfiguration and complete system visibility may be lost if redundant SCMs are not connected and the single SCM fails or is otherwise disconnected.

All console functions for the SMP system are provided by the SMC node 850 on the LAN. In the case of a hard partitioned system, a logical console is provided for each hard partition. In the illustrative embodiment, the SMP system may be expanded up to 256 processors (within, e.g., 32 8P drawers) and 256 I/O drawers, wherein each I/O drawer 700 includes a PBM 702 and each 8P drawer 600 includes an MBM 840. Therefore, the server management platform is preferably implemented as a local area network to accommodate such expandability. In an alternate embodiment, the SMC may be implemented as a web server and the server management LAN may function as a virtual private network (VPN). In accordance with this embodiment, system management of the SMP system may be controlled remotely over a network, such as the Internet, through a firewall at the SMC console station.

As noted, the TLB 566 located within each I/O port 560 on the IO7 500 is part of the system cache coherency domain and is utilized to translate addresses from the PCI (I/O) domain to the SMP system domain. In the illustrative embodiment, the PCI address space is 4 GB whereas the SMP system address space is much larger. A translation mechanism is thus needed to correlate locations in the smaller PCI address space with those of the larger SMP system address space. The I/O TLB 566 (or scatter-gather map) translates PCI addresses to the system addresses and maps those addresses throughout the larger SMP system space. Each entry of the I/O TLB is essentially a page table entry (PTE).

The TLBs 566 in the I/O subsystem are generally temporally "far away" from the SMP system processor and memory components. In order to avoid the complexity needed to bring the I/O subsystem into the system cache coherency domain, these I/O TLBs are typically not maintained in a coherent manner. Thus, in response to memory management software on the SMP system modifying a page table in memory, the I/O TLBs are typically flushed. Since there may be 4 TLBs (one in each I/O port) associated with each EV7 processor and there may be 256 processors in the SMP system, there may be as many as 1000 TLBs that require invalidation upon a change to a page table. Accordingly, it is not desirable to have software manage I/O TLB coherence. In accordance with another aspect of the present invention, a cache coherent, I/O TLB (scatter-gather map) technique is provided.

In the I/O subsystem, write operations are maintained in order relative to write operations and read operations are maintained in order relative to read operations. Moreover, write operations are allowed to pass read operations and write acknowledgements are used to confirm that their corresponding write operations have reached a point of coherency in the system. Ordering in the I/O subsystem is important from the perspective of any two end points. For example, if processor (EV7a) communicates with its associated IO7 (IO7a), then all operations must be maintained in order. However, communication between another processor (EV7b) and IO7a is not maintained in order. If ordering is important, another mechanism, such as semaphores between processors, must be utilized.

A routing table (RBOX_ROUTE) in the RBOX holds the values that are sent along with each message, as well as the directions that a message should travel in each dimension. The information from the routing table is all that is required to find the destination processor. The routing table at each processor contains 276 entries, one entry for each processor in the system I/O DMA Access and Exclusive Caching The IO7 may perform direct memory access (DMA) accesses to the EV7 system memory by way of exclusive caching. A DMA device is contained within the IO7 and is configured to service I/O bus read and write operations. For a DMA write stream, a first way to prefetch data in multiple blocks is via a stream of read modify request (ReadModReq) commands. The second is via a stream of invalidate-to-dirty request (InvaltoDirtyReq) commands to gain exclusive access to the block (presumably to write the entire block). The InvaltoDirtyReq commands require that the write operations be full-block writes.

For a DMA read stream there are two ways to prefetch data in multiple blocks, depending on the ordering required by the DMA device. The most efficient way is to use a stream of fetch requests (i.e., non-cacheable fetch) commands, while another way is to use a ReadModReq command to obtain exclusive access to the block (often to write a portion of the block). The advantage of this latter way is that the I/O device can implement a sequentially consistent read stream since the exclusive access forces order. A disadvantage involves generation of VictimClean messages to release exclusive access to the block. Multiple DMA devices that attempt to access the same block at the same time must be serialized, as will a processor and a DMA device.

When using the DMA access and exclusive caching technique, the DMA device is expected to force the eviction of a data block (cache line) immediately after receiving a forward for the cache block. The IO7 may exclusively cache copies of blocks for long periods of time. If a processor or another IO7 requests a copy of the block, the directory determines that the IO7 is the exclusive owner of the block and forwards the request to the IO7. When this happens, the directory expects to eventually receive both a ForwardMiss and a Victim (or VictimClean) response.

When the IO7 uses exclusive caching to access DMA requests, it should respond with ForwardMiss messages to every received forward request. The following is also required: (1) any currently cached blocks/TLB entries that could match the address in the forward message must be marked for eviction; and (2) any currently pending miss addressed file (MAF) entries that could possibly match the address must be marked so that the block eventually gets evicted after it returns. It should be noted that the receipt of a forward message does not imply that the IO7 currently holds a copy of the block. That is, a victim may be on its way from the IO7 to the directory before the IO7 receives the forward message. Note also that this scheme allows the IO7 to (exclusively) cache copies of scatter-gather maps or I/O TLB entries.

I/O Space Ordering

The EV7 processor supports the same I/O space ordering rules as the EV6 processor: load (LD)-LD ordering is maintained to the same IO7 or processor, store (ST)-ST ordering is maintained to the same IO7 or processor, LD-ST or ST-LD ordering is maintained to the same address, and LD-ST or ST-LD ordering is not maintained when the addresses are different. All of these ordering constraints are on a single processor basis to the same IO7 or processor. Multiple loads (to the same or different addresses) may be in flight without being responded to, though their in-flight order is maintained to the destination by the core/CBOX and the router. Similarly, multiple stores (the same or different addresses) can be in flight.

The EV7 processor also supports peer-to-peer I/O. In order to avoid deadlock among peer IO7 "clients", write operations are able to bypass prior read operations. This is required because read responses (completions) cannot be returned until prior write operations have completed in order to maintain PCI ordering constraints. By allowing the write operations to bypass the read operations, it is guaranteed that the write operations will eventually drain, thereby guaranteeing that the read operations will eventually drain.

Partitions

A domain is defined as a failure unit. A domain may constitute from one to many processors. The SMP system can be partitioned into domains via interprocessor register (IPR) settings. These domains provide varying degrees of isolation, survivability and sharing between domains, such as hard partitions, semi-hard partitions, firm partitions and soft partitions.

In a hard partition, there is no communication between domains. In this type of system, an EV7 processor, memory or I/O failure does not affect another domain. Each domain can be individually reset and booted via separate consoles. A firm partition allows domains to share a portion of its memory, the "global" memory, which is distributed throughout the domains. The local memory for each domain still resides within each domain. The EV7 processor can prevent domains from accessing local memory in other domains. A semi-hard partition is a firm partition with some additional restrictions and hardware reliability assurances. It requires that all communication within a domain must stay within the domain. Only sharing traffic to the global memory region may cross domain boundaries.

A soft partition allows for all communication to cross domain boundaries. The domain is strictly a global concept in this case. The partitions can share a global portion of the memory. Each domain has a region of local memory that the other domains cannot access.

Automated Backplane Connections

Figure 9:
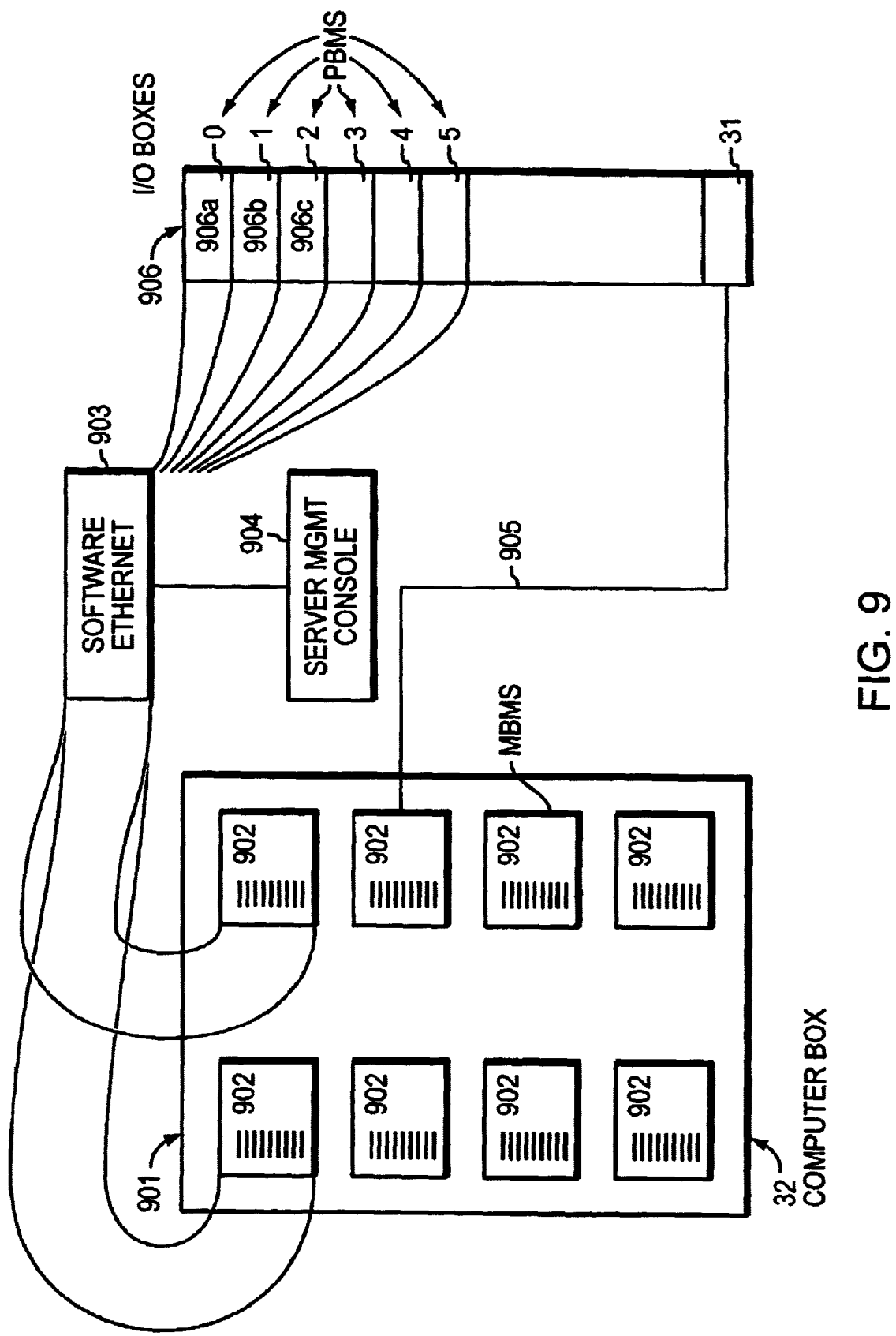
FIG. 9 is a schematic illustration of a preferred embodiment of various backplane connections to processors and I/O boxes.

FIG. 9 is a schematic illustration of a preferred embodiment of the various backplane cable connections used in the context of this invention. A computer box illustrated at 901 is typically a cluster of processors 902, which may be similar to those illustrated in FIG. 1, which also shows I/O boxes connected to the CPUs. FIG. 9 also illustrates a series of I/O boxes 906, an optional software Ethernet connection unit 903 and a server management console 904. It is conceivable that backplane connections may be used for direct connection between the processors 902 and I/O boxes 906, or, the connections may be accomplished through a software Ethernet 903 shown in FIG. 9. As is known to those skilled in the art, Ethernet 903 offers the advantage of being able to link several cable connections, and uses carrier sense multiple access with collision detection techniques to prevent network failures when two devices try to access a connection at the same time. Thus, using an intermediary Ethernet offers design and connection flexibility as compared with a system with direct backplane connection 905 which is used to connect a specific processor with a specific I/O box to provide the overall connection configuration desired by user.

A server management console 904, which may be a programmed PC, may be used in conjunction with the software Ethernet 903 or otherwise, to direct the manual backplane connection operation. Expediently, the server management console 904 has stored therein the various programmed backplane connections desired by the user for a given application. The screen of the management console 904 may prompt an unskilled technician for example, to make a cable connection between specific terminals in a given processor and an I/O box. The screen might also prompt the technician to use a specific length of cable which might be an optimum length for the purpose, considering the physical location of the processor and I/O box in question. Each physical cable connection is associated with a visual means such as an LED, which lights up as soon as a cable connection is made. Other visual means such as LCDs or flags or similar means may be used in lieu of the LEDs.

Soon after the prompted connection is made, diagnostic circuitry which is part of the server management console 904 takes over and verifies if the connection which is just completed is a proper connection as intended. Each cable used for the backplane connection may have dedicated wires/control lines for this purpose. If the connection is either erroneous or broken, then the server management console 904 responds to either keep the LEDs of the erroneous/broken connection continuously lit or flashing, depending on the user's choice. A continuously lit or flashing LED is an indication that further intervention is necessary to rectify an erroneous condition of the cable connection which is made. If the connection made is properly completed and is a connection as intended, the LEDs turn off, and the technician can obtain a prompt from the server management console 904 for the next connection to be made, as applicable.

Optionally, one or more of the processors 902 may be designed with an additional nonvolatile memory to remember all the backplane cable connections which were earlier made and which were proper connections. Thus, after the initiated backplane connections are all established and verified as proper by the server management console 904, it is conceivable that the use of the console 904 may be discontinued. The additional nonvolatile memory from one of the processors 902 might serve to assist future cable connection operations such as cable replacements as and when they become necessary. However, if new or additional cable connections are desired, such cable connections could be made part of the revised software in the server management console 94, which could still be used to guide operations such as "hot-replace or hot-add" for the backplane cable connections.

In the preferred embodiment illustrated in FIG. 9, a product name, i.e., Marvel, was used for commercial identification purposes. The processor units 902 consequently are identified as Marvel Backplane Manager units (MBM), and the I/O units or boxes 906 are additionally identified as Backplane Management units (PBM).

Figure 10:
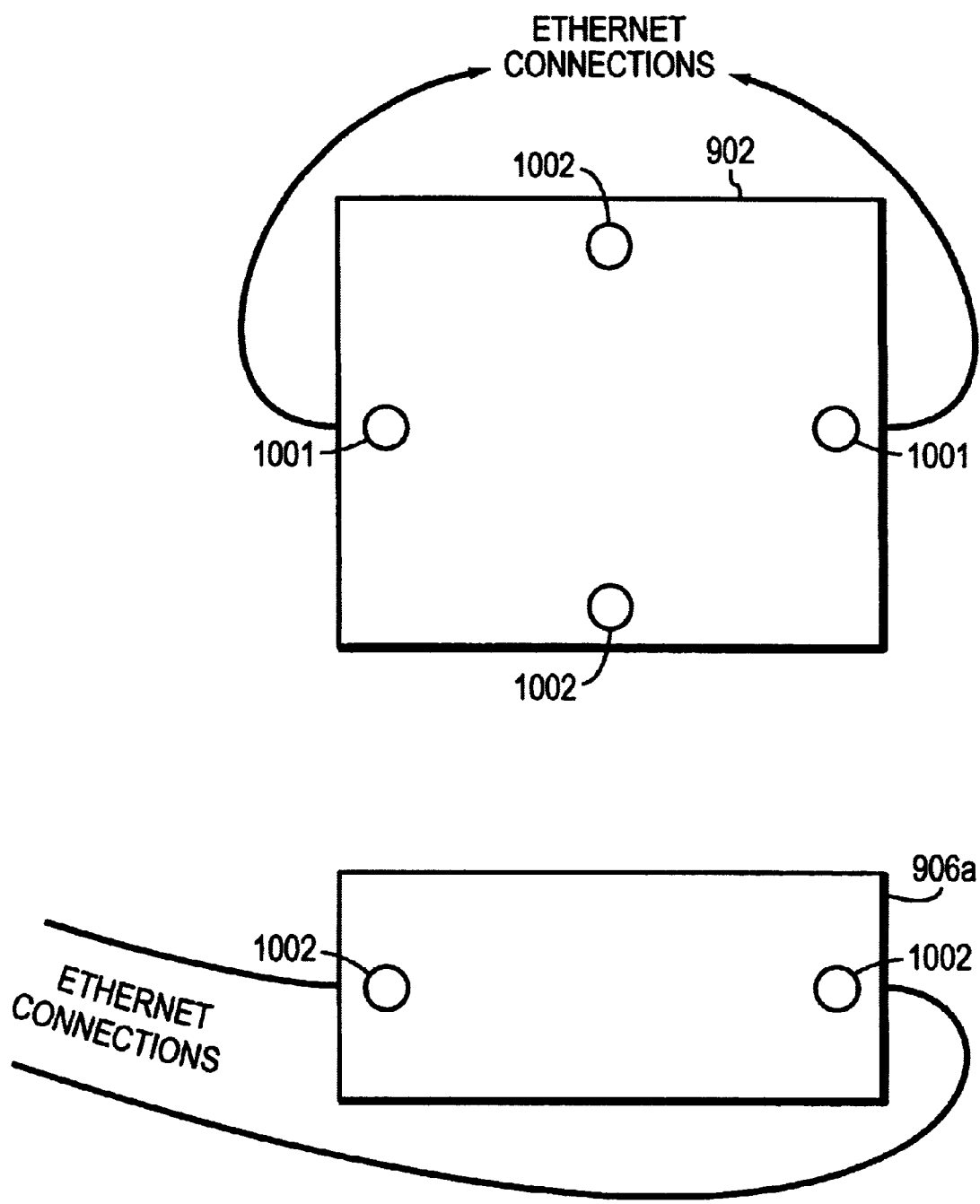
FIG. 10 is a schematic illustration of a processor and an I/O box showing LEDs associated with backplane cable connections.

FIG. 10 schematically illustrates a single processor MBM unit 902 with an Ethernet connection shown. Each MBM unit 902 has one or more LEDs 1001, 1002 which interact with the diagnostic circuitry in the server management console 904 to stay lit or turn off depending on the executed backplane connections. Each I/O box, as illustrated by way of example in FIG. 10 at 906a, has one or more LEDs 1002, one each associated with each backplane cable connection.

The LEDs shown in FIGS. 9 and 10 in association with backplane cable connections may be replaced with any other suitable visual means, for example, LCDs, or any other means which would functionally serve the purpose.

Backplane Connection Cables

The backplane connection cables could be I/O buses or may take the form of a 3.2 gigabit/sec cable which could have up to 80 conductors or more. Advantageously, each connection cable includes at least two wires which are dedicated to diagnostic testing and control of the LEDs.

The following is a preferred example of the details of the Cable Test Group.

CTT Cable Test Group

CTT.1 Set Cable Test Signal State

The Marvel system contains test signals in each cable linking pairs of EV7 routing axes around the external 8P connections. The 6 IP cables link EV7s for routing purposes and the 8 IO cables link the single EV7 to IO7 risers on PBMs. The signals light and extinguish LED pairs and may be asserted and/or read by MBMs or PBMs at each end of the cable. This command is directed at an MBM or PBM to modify the state of the cable test signals controlled by that entity.

| Command: SET CABLE TEST SIGNAL STATE | | | | | | | | | | |
|---|---|---|---|---|---|---|---|---|---|---|
| Size (dec) | Start (hex) | End (hex) | Bit 7 | Bit 6 | Bit 5 | Bit 4 | Bit 3 | Bit 2 | Bit 1 | Bit 0 |
| 4 | 0 | 3 | Originator IP address ||||||||
| 4 | 4 | 7 | Destination IP address ||||||||
| 4 | 8 | B | Identifier ||||||||
| 2 | C | D | Command Code (0x0601) ||||||||
| 1 | E | E | Port Direction ||||||||
| 1 | F | F | Port Pair ||||||||
| 1 | 10 | 10 | Led Combination ||||||||
| 1 | 11 | 11 | On/Off ||||||||

1. Port Direction-0 = N, 1 = S, 2 = E, 3 = W, 4 = IO Cables.
2. Port Pair - defines the exact cable to be set.
IP cables require 0 or 1 for North or South Pairs (0 being the 1st set of EV7s and 1 being the 2nd set of EV7s on the North or South port) East West cables should always be 0.
IO cables on PBMs require riser number (0–3).
IO cables on MBMs use the EV7 reference (0–7).
3. LED combination-1 = Led A set, 2 = Led B set, 3 = Led A & B sets.
4. On/Off-0 for on, 1 for off.

| Response: SET CABLE TEST SIGNAL STATE | | | | | | | | | | |
|---|---|---|---|---|---|---|---|---|---|---|
| Size (dec) | Start (hex) | End (hex) | Bit 7 | Bit 6 | Bit 5 | Bit 4 | Bit 3 | Bit 2 | Bit 1 | Bit 0 |
| 4 | 0 | 3 | Originator IP address ||||||||
| 4 | 4 | 7 | Destination IP address ||||||||
| 4 | 8 | B | Identifier ||||||||
| 2 | C | D | Response Code (0x8601) ||||||||
| 2 | E | F | Status (See App. A) ||||||||

CTT.2 Get Cable Test Signal State

The Marvel system contains test signals in each cable linking two EV7s or an EV7 to an IO7. These signals may be asserted and/or read by MBMs or PBMs at each end of the cable. This command is directed at an MBM or PBM to read the state of one of the set of cable test signals controlled by that entity.

CTT.3 Send Cable ID

This command is used to serially transmit the EV7 ID or the IO Riser Number from the MBM or PBM to the receiving end (either another MBM or a PBM). This is used to identify the connections at either end of an IP or I/O cable.

| Command: GET CABLE TEST SIGNAL STATE | | | | | | | | | | | |
|---|---|---|---|---|---|---|---|---|---|---|---|
| Size (dec) | Start (hex) | End (hex) | Bit 7 | Bit 6 | Bit 5 | Bit 4 | Bit 3 | Bit 2 | Bit 1 | Bit 0 |
| 4 | 0 | 3 | Originator IP address ||||||||
| 4 | 4 | 7 | Destination IP address ||||||||
| 4 | 8 | B | Identifier ||||||||
| 2 | C | D | Command Code (0x0602) ||||||||
| 1 | E | E | Port Direction ||||||||
| 1 | F | F | Port Pair ||||||||

1. Port Direction-0 = N, 1 = S, 2 = E, 3 = W, 4 = IO Cables.
2. Port Pair - defines the exact cable to be read.
IP cables require 0 or 1 for North or South Pairs (0 being the $1^{st}$ set of EV7s and 1 being the $2^{nd}$ set of EV7s on the North or South port) East West cables should always be 0.
IO cables on PBMs require riser number (0–3).
IO cables on MBMs use the EV7 reference (0–7).

| Response: GET CABLE TEST SIGNAL STATE | | | | | | | | | | | |
|---|---|---|---|---|---|---|---|---|---|---|---|
| Size (dec) | Start (hex) | End (hex) | Bit 7 | Bit 6 | Bit 5 | Bit 4 | Bit 3 | Bit 2 | Bit 1 | Bit 0 |
| 4 | 0 | 3 | Originator IP address ||||||||
| 4 | 4 | 7 | Destination IP address ||||||||
| 4 | 8 | B | Identifier ||||||||
| 2 | C | D | Response Code (0x8602) ||||||||
| 2 | E | F | Status (See App. A) ||||||||
| 1 | 10 | 10 | LEDs Value ||||||||

LEDs value-1 = Led A on, 2 = Led B on, 3 = Led A & B both on.

| Command: SEND CABLE ID | | | | | | | | | | | |
|---|---|---|---|---|---|---|---|---|---|---|---|
| Size (dec) | Start (hex) | End (hex) | Bit 7 | Bit 6 | Bit 5 | Bit 4 | Bit 3 | Bit 2 | Bit 1 | Bit 0 |
| 4 | 0 | 3 | Originator IP address ||||||||
| 4 | 4 | 7 | Destination IP address ||||||||
| 4 | 8 | B | Identifier ||||||||
| 2 | C | D | Command Code (0x0603) ||||||||
| 1 | E | E | Port Direction ||||||||
| 1 | F | F | Port Pair ||||||||
| 1 | 10 | 10 | ID Value ||||||||

1. Port Direction-0 = N, 1 = S, 2 = E, 3 = W, 4 = IO Cables.
2. Port Pair - defines the exact cable to be set.
IP cables require 0 or 1 for North or South Pairs (0 being the $1^{st}$ set of EV7s and 1 being the $2^{nd}$ set of EV7s on the North or South port) East West cables should always be 0.
IO cables on PBMs require riser number (0–3).
IO cables on MBMs use the EV7 reference (0–7).
3. Id Value - the EV7 or IO7 or any Unique Identifier to be sent on the test signal.

Response: SEND CABLE ID

| Size (dec) | Start (hex) | End (hex) | Bit 7 | Bit 6 | Bit 5 | Bit 4 | Bit 3 | Bit 2 | Bit 1 | Bit 0 |
|---|---|---|---|---|---|---|---|---|---|---|
| 4 | 0 | 3 | Originator IP address ||||||||
| 4 | 4 | 7 | Destination IP address |||||||||
| 4 | 8 | B | Identifier |||||||||
| 2 | C | D | Response Code (0x8603) |||||||||
| 2 | E | F | Status (See App. A) |||||||||

CTT.4 Receive Cable ID

This command is used to serially receive the EV7 ID from the MBM at the transmitting end. This is used to identify the connections at either end of an IP or I/O cable. The receiver runs until it successfully receives an ID or times out.

Command: RECEIVE CABLE ID

| Size (dec) | Start (hex) | End (hex) | Bit 7 | Bit 6 | Bit 5 | Bit 4 | Bit 3 | Bit 2 | Bit 1 | Bit 0 |
|---|---|---|---|---|---|---|---|---|---|---|
| 4 | 0 | 3 | Originator IP address |||||||||
| 4 | 4 | 7 | Destination IP address |||||||||
| 4 | 8 | B | Identifier |||||||||
| 2 | C | D | Command Code (0x0604) |||||||||
| 3 | E | 10 | Port Direction |||||||||
| 4 | 11 | 14 | Port Pair |||||||||

1. Port Direction-0 = N, 1 = S, 2 = E, 3 = W, 4 = IO Cables, 5 = All IP Cables, 6-All IO Cables.
2. Port Pair - defines the exact cable to be set.

IP cables require 0 or 1 for North or South Pairs (0 being the 1$^{st}$ set of EV7s and 1 being the 2$^{nd}$ set of EV7s on the North or South port) East West cables should always be 0.

IO cables on PBMs require riser number (0–3).

IO cables on MBMs use the EV7 reference (0–7).

Response: RECEIVE CABLE ID

| Size (dec) | Start (hex) | End (hex) | Bit 7 | Bit 6 | Bit 5 | Bit 4 | Bit 3 | Bit 2 | Bit 1 | Bit 0 |
|---|---|---|---|---|---|---|---|---|---|---|
| 4 | 0 | 3 | Originator IP address |||||||||
| 4 | 4 | 7 | Destination IP address |||||||||
| 4 | 8 | B | Identifier |||||||||
| 2 | C | D | Response Code (0x8604) |||||||||
| 2 | E | F | Status (See App. A) |||||||||
| 1 | 10 | 10 | Port Direction |||||||||
| 1 | 11 | 11 | Port Pair |||||||||
| 1 | 12 | 12 | ID Value |||||||||

1. Port Direction - returned & needed when All Directions are being checked.
2. Port Pair - returned & needed when All Ports are being checked.
3. ID Value - The Unique Identifier received.

CTT.5 Get MBM IP Cabling

This command is used to retrieve the set of IP Cabling for a given MBM. The PMU Server uses this request to obtain a complete IP cabling diagram. There are a possibility of 6 external IP cables with pairs of EV7s connected on each MBM 2 North, 2 South, 1 East, 1 West. The EV7 ID of 1 of the 2 EV7s on the Port as well as the MBM thumb-wheel number that the EV7 is on are returned for all 6 MBM cables.

| Size (dec) | Start (hex) | End (hex) | Bit 7 | Bit 6 | Bit 5 | Bit 4 | Bit 3 | Bit 2 | Bit 1 | Bit 0 |
|---|---|---|---|---|---|---|---|---|---|---|
| | | | | | Command: GET MBM IP CABLING | | | | | |
| 4 | 0 | 3 | | | | Originator IP address | | | | |
| 4 | 4 | 7 | | | | Destination IP address | | | | |
| 4 | 8 | B | | | | Identifier | | | | |
| 2 | C | D | | | | Command Code (0x0605) | | | | |

| Size (dec) | Start (hex) | End (hex) | Bit 7 | Bit 6 | Bit 5 | Bit 4 | Bit 3 | Bit 2 | Bit 1 | Bit 0 | |
|---|---|---|---|---|---|---|---|---|---|---|---|
| | | | | | Response: GET MBM IP CABLING | | | | | | |
| 4 | 0 | 3 | | | | Originator IP address | | | | | |
| 4 | 4 | 7 | | | | Destination IP address | | | | | |
| 4 | 8 | B | | | | Identifier | | | | | |
| 2 | C | D | | | | Response Code (0x8605) | | | | | |
| 2 | E | F | | | | Status (See App. A) | | | | | |
| 2 | 10 | 11 | | | | EV7 Coordinates for Connection on N1 | | | | | Repeat |
| 1 | 12 | 12 | | | | Port Direction for Connection on N1 | | | | | all 6 Cables |
| 2 | 13 | 14 | | | | Thumb-Wheel for Connection on N1 | | | | | (N1, N2, S1 |

1. EV7 ID - the EV7 coordinates for the first EV7 at the other end of the cable set (N/S, E/W).
2. Port direction - The Port Direction to (0 = N, 1 = S, 2 = E, 3 = W) for the EV7 at the other end of the cable. If the high order bit is set the on this byte the cable is not connected to the port that was expected. (e.g. 0x83 = Cable is connected to the West Port but was not expected to be there).
3. Thumb-wheel - The MBM Thumbwheel Number that the EV7 at the other end of the cable is on.

These 3 entries repeat for all 6 possible external connections in the order N1,N2,S1,S2,E,W).

CTT.6 Get PBM IO Cabling

This command is used to retrieve the set of IO Cabling for a given PBM. The PMU Server uses this request to display a complete IO cabling diagram. There are a possibility of 4 external IO cables connected on each PBM, 1 for each IO Drawer. The EV7 ID and the MBM thumb-wheel number that the EV7 is on are returned for all 4 PBM cables.

| Size (dec) | Start (hex) | End (hex) | Bit 7 | Bit 6 | Bit 5 | Bit 4 | Bit 3 | Bit 2 | Bit 1 | Bit 0 |
|---|---|---|---|---|---|---|---|---|---|---|
| | | | | | Command: GET PBM IO CABLING | | | | | |
| 4 | 0 | 3 | | | | Originator IP address | | | | |
| 4 | 4 | 7 | | | | Destination IP address | | | | |
| 4 | 8 | B | | | | Identifier | | | | |
| 2 | C | D | | | | Command Code (0x0606) | | | | |

| Size (dec) | Start (hex) | End (hex) | Bit 7 | Bit 6 | Bit 5 | Bit 4 | Bit 3 | Bit 2 | Bit 1 | Bit 0 |
|---|---|---|---|---|---|---|---|---|---|---|
| | | | | | Response: GET PBM IO CABLING | | | | | |
| 4 | 0 | 3 | | | | Originator IP address | | | | |
| 4 | 4 | 7 | | | | Destination IP address | | | | |
| 4 | 8 | B | | | | Identifier | | | | |

-continued

Response: GET PBM IO CABLING

| Size (dec) | Start (hex) | End (hex) | Bit 7 | Bit 6 | Bit 5 | Bit 4 | Bit 3 | Bit 2 | Bit 1 | Bit 0 | |
|---|---|---|---|---|---|---|---|---|---|---|---|
| 2 | C | D | | | | Response Code (0x8606) | | | | | |
| 2 | E | F | | | | Status (See App. A) | | | | | |
| 2 | 10 | 11 | | | | EV7 ID Connected to IO Drawer 0 | | | | | Repeat for all 4 ports |
| 2 | 12 | 13 | | | | Thumb-Wheel of Rack & MBM for EV7 Connected to IO Drawer | | | | | |

1. EV7 ID - the EV7 coordinates in the mesh for the EV7 at the other end of the IO cable.
2. Thumb-wheel - The MBM thumbwheel number that the EV7 at the other end of the cable is on.
These 2 entries repeat for all 4 possible external connections. A zero entry in both fields implies no cable is present.

CTT.7 Get Cabling Configuration

This command is used to distribute the volatile cabling configuration for the Marvel System among SM LAN members. The Platform Management Utility (PMU) Server (not shown) maintains the current copy and responds to all requests.

CTT.8 Reconfigure Cabling

This command is sent from the PMU to the PMU Server when an operator has made a cabling change and the cabling database has to be redone. On completion, the Cabling Database should reflect the new cable setup.

Command: GET CABLING CONFIGURATION

| Size (dec) | Start (hex) | End (hex) | Bit 7 | Bit 6 | Bit 5 | Bit 4 | Bit 3 | Bit 2 | Bit 1 | Bit 0 |
|---|---|---|---|---|---|---|---|---|---|---|
| 4 | 0 | 3 | | | | Originator IP address | | | | |
| 4 | 4 | 7 | | | | Destination IP address | | | | |
| 4 | 8 | B | | | | Identifier | | | | |
| 2 | C | D | | | | Command Code (0x0607) | | | | |

Response: GET CABLING CONFIGURATION

| Size (dec) | Start (hex) | End (hex) | Bit 7 | Bit 6 | Bit 5 | Bit 4 | Bit 3 | Bit 2 | Bit 1 | Bit 0 | |
|---|---|---|---|---|---|---|---|---|---|---|---|
| 4 | 0 | 3 | | | | Originator IP address | | | | | |
| 4 | 4 | 7 | | | | Destination IP address | | | | | |
| 4 | 8 | B | | | | Identifier | | | | | |
| 2 | C | D | | | | Command Code (0x8607) | | | | | |
| 1 | E | E | | | | EV7 Count | | | | | |
| 2 | F | 10 | | | | EV7 ID N/S, E/W | | | | | repeat |
| 1 | 11 | 11 | | | | MBM Thumb-Wheel | | | | | for |
| 2 | 12 | 13 | | | | EV7 ID at the end of N | | | | | each |
| 2 | 14 | 15 | | | | EV7 ID at the end of S | | | | | EV7 |
| 2 | 16 | 17 | | | | EV7 ID at the end of E | | | | | in |
| 2 | 18 | 19 | | | | EV7 ID at the end of W | | | | | EV7 count |
| 1 | n | n | | | | IO7 Count | | | | | |
| 2 | n + 1 | n + 2 | | | | IO7 Id | | | | | repeat for |
| 2 | n + 3 | n + 4 | | | | EV7 ID at end of IO | | | | | Each IO7 |

1. EV7 Count - the number of Ev7 entries
2. EV7 ID - the EV7 coordinates in the mesh
3. MBM Thumb-wheel - the thumb-wheel identifier of where the EV7 resides.
4. EV7 ID at end of the port with direction (N, S, E, W) - coordinate pair (N/S, E/W) of the EV7 at the other end of that port if a cable is present. For those ports that have no cable connections 0xff appears in both coordinates.
5. IO7 Count - the number of IO7 drawers.
6. IO7 Id - the PBM thumb-wheel and IO7 drawer number (0–3).
7. EV7 ID at end of IO - coordinates in mesh of EV7 at end of IO.

| | | | | Command: RECONFIGURE CABLING | | | | | | |
|---|---|---|---|---|---|---|---|---|---|---|
| Size (dec) | Start (hex) | End (hex) | Bit 7 | Bit 6 | Bit 5 | Bit 4 | Bit 3 | Bit 2 | Bit 1 | Bit 0 |
| 4 | 0 | 3 | | | Originator IP address | | | | | |
| 4 | 4 | 7 | | | Destination IP address | | | | | |
| 4 | 8 | B | | | Identifier | | | | | |
| 2 | C | D | | | Command Code (0x0608) | | | | | |

| | | | | Response: RECONFIGURE CABLING | | | | | | |
|---|---|---|---|---|---|---|---|---|---|---|
| Size (dec) | Start (hex) | End (hex) | Bit 7 | Bit 6 | Bit 5 | Bit 4 | Bit 3 | Bit 2 | Bit 1 | Bit 0 |
| 4 | 0 | 3 | | | Originator IP address | | | | | |
| 4 | 4 | 7 | | | Destination IP address | | | | | |
| 4 | 8 | B | | | Identifier | | | | | |
| 2 | C | D | | | Response Code (8x8608) | | | | | |
| 2 | E | F | | | Status (See App. A) | | | | | |

FIG. 11 gives an exemplary version of the Cable Test group of messages. The Marvel system contains test signals in each cable linking pairs of EV7 routing axes around the external 8P connections. The 6 IP cables link EV7s for routing purposes and the 8 IO cables link the single EV7 to IO7 risers on PBMs. The signals light and extinguish LED pairs and may be asserted and/or read by MBMs or PBMs at each end of the cable. This command is directed at an MBM or PBM to modify the state of the cable test signals controlled by that entity.

Cable Configuration and Testing

A volatile copy of the cable connections for both IP and IO cabling is expediently prepared by the PMU Server after a group is formed. PMUs and Partition Coordinations can request the RECONFIGURE CABLING to have the PMU Server re-check cable connections. 8 IO ports and 6 IP ports are located on each MBM and 4 IO ports on each PBM. Each cable's connector contains: 1) an input signal to determine of the cable is present, 2) two sets of LEDs marked A & B at each end of the connection, 3) the ability to turn any set of LEDs on or off and read the result. A LED lights on both ends of the cable when zero is written to the cable test signal. To conserve power, LEDs should normally be extinguished.

IP Cable Discovery

As part of the determination of the proper inter-processor physical cabling layout, each MBM cooperates in the PMU Server's cable testing by responding to the requests for GET MBM IP CABLING. IP cables connect pairs of EV7 external 8P routing ports. The 6 IP ports are 2 North, 2 South, 1 East and 1 West.

Figure 12:
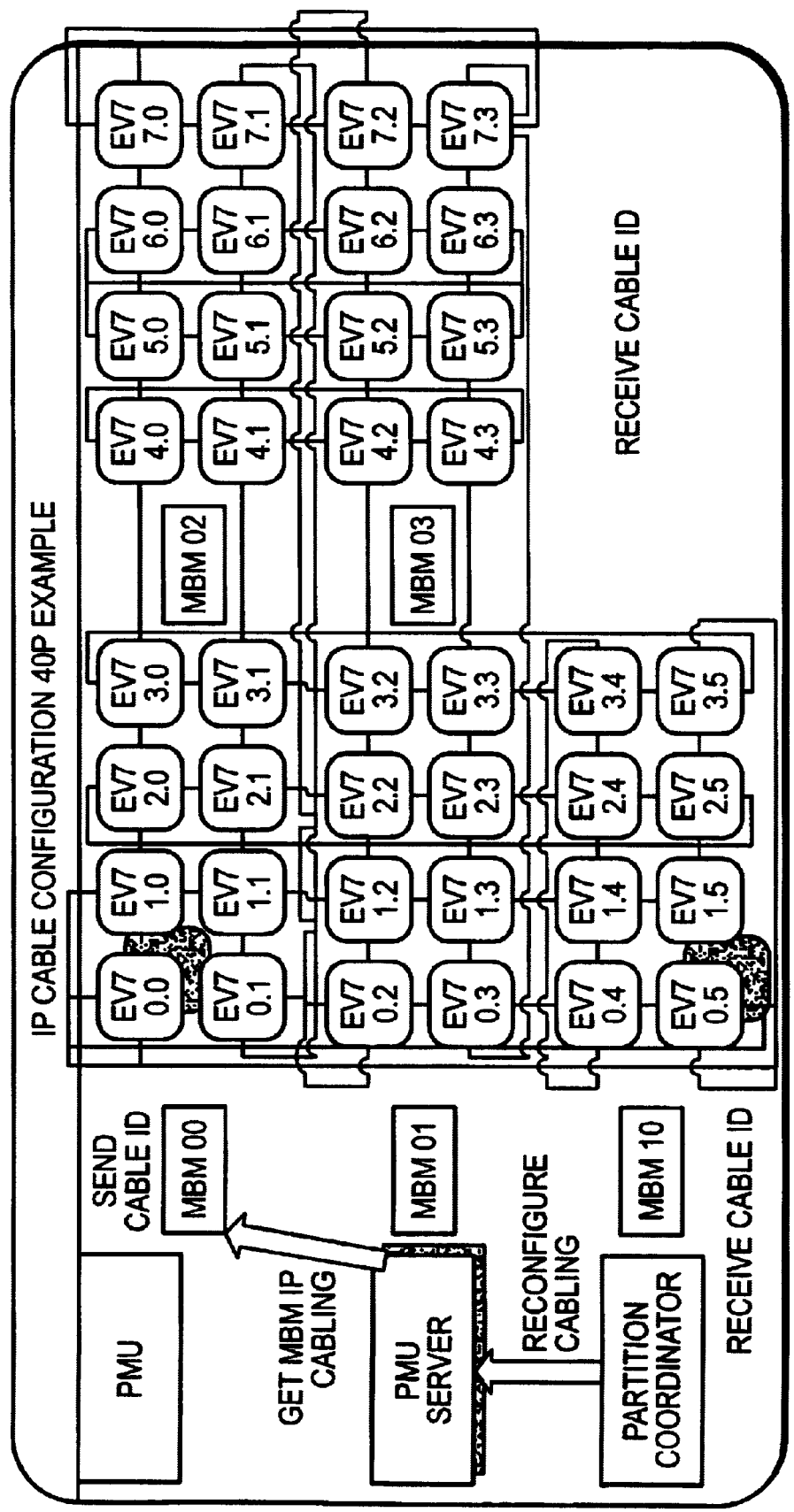
FIG. 12 shows an Internet Protocol Cable Configuration Block Diagram.

An IP cable configuration diagram is shown in FIG. 12.

The MBM requests a RECEIVE CABLE ID from each MBM expected to be on the other end of each of his external ports. The MBM sends the ID down the cable by performing the equivalent to SEND CABLE ID request in his own ports. Whoever responds positively to the request returns the receiving ends port direction and EV7 port number and the EV7 ID received. This is then repeated for all external port directions on the MBM. Each MBM known to be present in the Marvel system reports his cabling connections to the PMU Server who maintains the cabling database.

There are certain illegal thumb-wheel number settings for rack thumb-wheel and MBM whumb-wheels as well as invalid cabling configurations that are checked at this time and reported as an error in the error log. The MBM thumb-wheel number consists of a rack number (0–7) and an MBM number (0–3).

IO Cable Discovery

The PMU Server makes a similar determination of all IO7 to EV7 cable connections by making a GET PBM IO CABLING request to each PBM. The PBM in turn sends a RECEIVE CABLE ID to all MBMs; then sends the IO7 riser ID down the I/O cable via a SEND CABLE ID request. The PBM responds with the EV7 IDs connected to the I/O risers. The PMU Server repeats this for all PBMs while maintaining the cabling database.

By the use of this invention, completion of backplane cable connections is accomplished not only in a fool proof and reliable manner, but using semiskilled personnel. While handling backplane connection cables for clusters of processors which need to be connected to other processors or LANs or I/O boxes, it would be a formidable task to handle a multiplicity of cables and manage "hot-add, hot-swap, hot-repair" in a convenient and reliable manner. The present invention enables one to address the foregoing difficult tasks in cable connection management in a very reliable and expedient manner.

Figure 13:
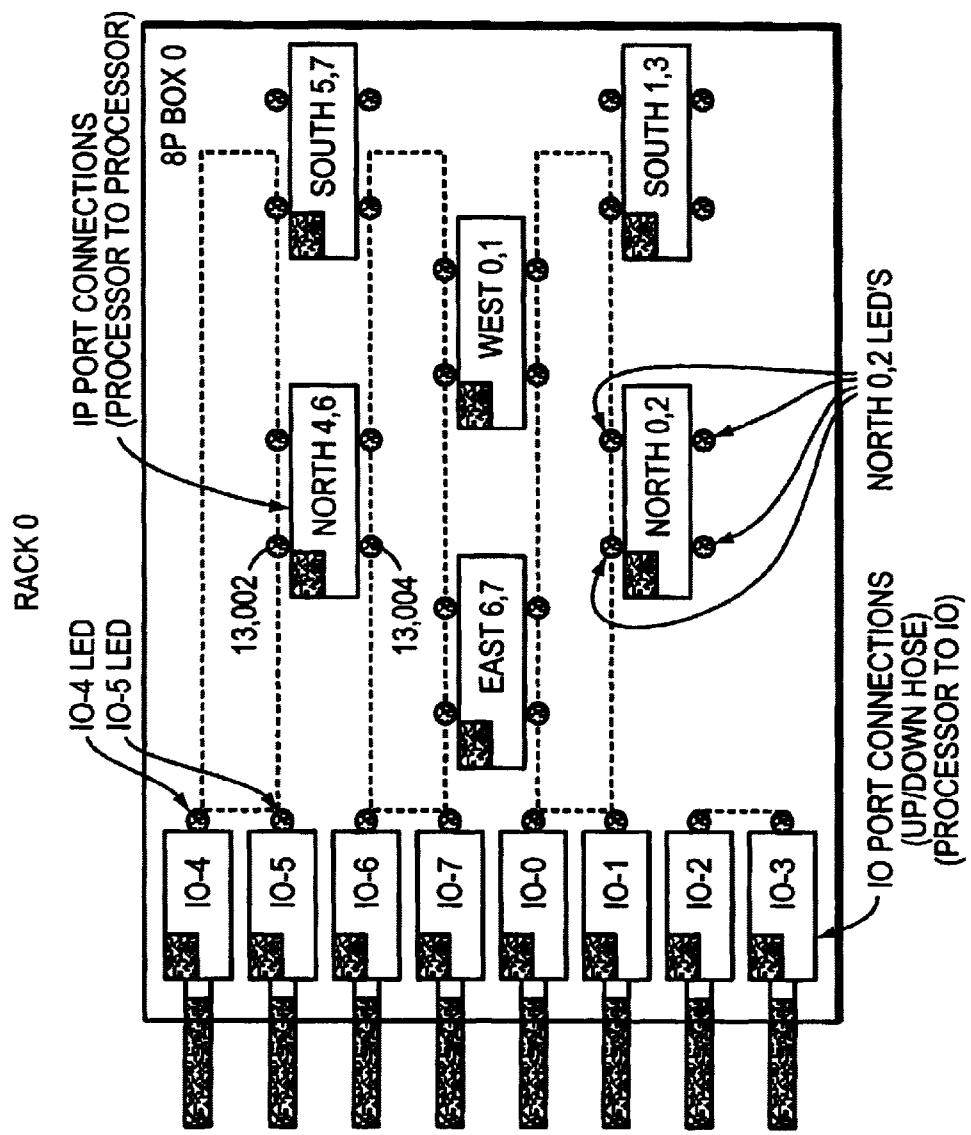
FIG. 13 is detailed drawing of processor to processor connections.

FIG. 13 gives a detailed drawing of the processor to processor connections, the IP cables. Blocks 10-0 through 10-7 are the processor to IO connections. The IP port connections are given by the North, South, East, and West labeled boxes. The LEDs associated with each connection are shown as a dark circle 13,002, and 13,004, etc. beside each processor to processor IP connection.

Features of the invention comprise the following: 1. the ability to detect what IO chassis is connected to what CPU by sending the ID down the IO hose; 2. the ability to disconnect cables without regard to the availability of a management station; 3. the ability to detect misconfigured mesh on the IP links, without regard to the availability of a management station.

The preferred embodiment/s described herein above use LEDs for the visual means which indicate if a backplane cable connection has been properly made. Other types of visual indicators as alternatives are acceptable as will be evident to those who are skilled in the art. Likewise even though the preferred embodiment uses 80 conductor 3.2 gigabit/ sec cables, other cables or I/O hoses which functionally perform the desired tasks are acceptable as alternatives. The present invention can be applied in any location where there is need to connect/replace cables in accordance with a predetermined configuration in a reliable and foolproof manner. All such variations and applications are intended to be covered in the invention, the scope of which is as in the appended claims.

What is claimed is:

1. A backplane cable connection and verification system wherein at least one processor needs to be connected using cable connections to a processor or an Input/Output (I/O) box, said system comprising:

identification means for providing identification of connection terminals on a processor or I/O box to be connected to connection terminals of a second processor or I/O box by using connection cables;

visual means which can be turned on/off and are associated with each connection terminal;

control means to turn on said visual means when a corresponding connection terminal is manually connected to a second connection terminal as guided by said identification means; and automatic diagnostic circuitry to check if two identified connection terminals are properly manually connected in accordance with user requirements, said diagnostic circuitry having means to turn off visual means relating to those connection cables which are properly connected and which continue to be in tact as verified by the diagnostic circuitry, said diagnostic circuitry including means to keep said visual means on/blinking which correspond to completed cable connections which are faulty or broken as verified by the diagnostic circuitry.

2. A system as in claim 1 wherein said identification means comprises a server management console.

3. A system as in claim 1 wherein said visual means comprise LEDs.

4. A system as in claim 1 wherein said connection cables comprise I/O hoses.

5. A system as in claim 1 wherein at least some of the connection cables comprise 3.2 gigabit/sec cables.

6. A system as in claim 1 including a software Ethernet wherein said at least one processor is connected through the software Ethernet to a processor or an I/O box.

7. A system as in claim 1 including a cluster of eight processors, connected to at least 32 I/O boxes.

8. A system as in claim 2 wherein at least one said processor/I/O box includes sufficient nonvolatile memory to memorize cable connections which are manually completed.

9. A system as in claim 2 wherein said server management console includes means for designing connections and choose optimal cable lengths considering physical locations of the processors and the I/O boxes, and storing information regarding cable connections and physical cable connection terminal identification.

10. A system as in claim 3 wherein each of said connection cables includes a pair of wires dedicated to control associated LEDs.

11. A system as in claim 5 where at least some of the connection cables comprise 80 conductors per cable.

12. A system as in claim 6 wherein said software Ethernet comprises a LAN.

13. A backplane cable connection and verification method wherein at least one processor is connected using cable connections to a processor or an Input/Output (I/O) box, said method comprising:

providing identification of connection terminals on a processor or I/O box to be connected to connection terminals of a second processor or I/O box by using connection cables;

providing visual means which can be turned on/off and are associated with each connection terminal;

controlling to turn on said visual means when a corresponding connection terminal is manually connected to a second connection terminal as guided by said identification means;

automatically diagnosing by using diagnostic circuitry to check if two identified connection terminals are properly manually connected in accordance with user requirements; and turning off visual means relating to those connection cables which are properly connected and continue to be in tact as verified by the diagnostic circuitry, and including the step of keeping said visual means on/blinking which correspond to and are connected to cable connections which are faulty or broken as verified by the diagnostic circuitry.

14. A method as in claim 13 wherein said step of providing identification comprises using a programmed server management console.

15. A method as in claim 13 wherein said visual means comprise LEDs.

16. A method as in claim 13 wherein said connection cables comprise I/O hoses.

17. A method as in claim 13 wherein at least some of the connection cables comprise 3.2 gigabits/sec cables.

18. A method as in claim 13 wherein said at least one processor is connected through a software Ethernet to a processor or an I/O box.

19. A method as in claim 13 including a cluster of eight processors, connected to at least 32 I/O boxes.

20. A method as in claim 14 including the step of providing sufficient nonvolatile memory in at least one said processor or I/O box to memorize cable connections which are manually competed.

21. A method as in claim 14 including the step of using said server management console for designing connections and choosing optimal cable lengths, considering physical locations of the processors and the I/O boxes, and storing information regarding cable connections and physical cable connection terminal identification.

22. A method as in claim 15 wherein each of said connection cables includes a pair of wires dedicated to control associated LEDs.

23. A method as in claim 17 where at least some of the connection cables comprise 80 conductors per cable.

24. A method as in claim 18 wherein said software Ethernet comprises a LAN.

25. An automated backplane cable connection and verification system wherein at least one processor module is manually connected using cable connections to another processor module or an Input-Output (I/O) box, said system processor module and I/O box including connection terminals, said system comprising:

a programmed server management control console including means for identifying said connection terminals and prompting a technician to manually complete at least one backplane cable connection based on identification of the connection terminals and a predetermined cable connection configuration;

a plurality of LEDs associated one each with each of said connection terminals, said LEDs initially being lit by dedicated conductor wires in cable connections upon making a manual backplane cable connection;

said programmed server management control console including automatic diagnostic circuitry which verifies correctness and integrity of completed manual backplane cable connections in comparison with said predetermined cable connection configuration, said server management control console turning off LEDs corresponding to each manually completed backplane cable connection which is verified by said automatic diagnostic circuitry as a proper connection, said control console including means to retain respective LEDs to continue in a lit condition if the automatic diagnostic circuitry finds that a completed backplane connection is incorrect or faulty, thereby signaling need for intervention.

26. An automated backplane cable connection and verification system wherein at least one processor module is manually connected using cable connections to another processor module or an Input-Output (I/O) box, said system processor module and I/O box including connection terminals, the method comprising:

using a programmed server management control console means for identifying said connection terminals and prompting a technician to manually complete at least one backplane cable connection based in identification of the connection terminals and a predetermined cable connection configuration;

providing a plurality of LEDs associated one each with each of said connection terminals, said LEDs being initially lit by dedicated conductor wires in cable connections upon making a manual backplane cable connection;

automatically diagnosing by using diagnostic circuitry provided in said programmed server management control console to verify correctness of completed manual backplane cable connections in comparison with said predetermined cable configuration, and also to verify integrity of completed manual backplane cable corrections, to turn off LEDs corresponding to each backplane cable connection which is verified to be a proper cable connection by said automatic diagnostic circuitry, and retain respective LEDs to continue in a lit condition if the automatic diagnostic circuitry finds a completed backplane connection is incorrect or faulty, thereby signaling need for intervention.

* * * * *